United States Patent
Goldfeder (10) Patent No.: US 9,465,586 B2
(45) Date of Patent: Oct. 11, 2016

(54) THIRD PARTY APPLICATION SCRIPTABILITY

(71) Applicant: GOOGLE INC., Mountain View, CA (US)

(72) Inventor: Corey Goldfeder, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 13/779,599

(22) Filed: Feb. 27, 2013

(65) Prior Publication Data

US 2014/0245253 A1    Aug. 28, 2014

(51) Int. Cl.
  *G06F 9/44*    (2006.01)
  *G06F 9/455*   (2006.01)

(52) U.S. Cl.
  CPC ............ *G06F 8/00* (2013.01); *G06F 9/45529* (2013.01)

(58) Field of Classification Search
  CPC .............. G06F 8/10; G06F 8/20; G06F 8/38
  See application file for complete search history.

(56) References Cited

U.S. PATENT DOCUMENTS

| | | | | |
|---|---|---|---|---|
| 6,167,534 A * | 12/2000 | Straathof et al. | ............ | 714/38.1 |
| 6,947,943 B2 * | 9/2005 | DeAnna | ................. | G06F 9/465 |
| | | | | 707/781 |
| 7,721,303 B2 * | 5/2010 | Alves de Moura | ....... | G06F 8/38 |
| | | | | 709/202 |
| 7,779,385 B2 * | 8/2010 | Hegde | ...................... | G06F 8/36 |
| | | | | 707/602 |
| 8,082,539 B1 * | 12/2011 | Schelkogonov et al. | ..... | 717/106 |
| 8,091,067 B2 * | 1/2012 | Roche | .............. | G06F 17/30392 |
| | | | | 717/107 |
| 8,099,713 B2 * | 1/2012 | Becker | ............... | G06F 9/45512 |
| | | | | 717/115 |
| 8,595,284 B2 * | 11/2013 | Sheshagiri et al. | ........... | 709/201 |
| 8,640,093 B1 * | 1/2014 | Gill | ....................... | G06Q 30/02 |
| | | | | 717/120 |
| 8,689,344 B2 * | 4/2014 | Court | ............................. | 726/26 |
| 8,997,069 B2 * | 3/2015 | Fanning | .................... | G06F 8/43 |
| | | | | 717/143 |
| 9,092,540 B2 * | 7/2015 | Hansknecht | ...... | G06F 17/30899 |
| 2004/0098704 A1 * | 5/2004 | Becker | ............... | G06F 17/3089 |
| | | | | 717/115 |
| 2005/0257196 A1 * | 11/2005 | Hollander | ........... | G06F 11/3688 |
| | | | | 717/115 |

(Continued)

OTHER PUBLICATIONS

Richardson et al., RESTful Web Service, published by O'Reilly, ISBN 978-0-596-52926-0, May 2009, pp. 1-448.*

(Continued)

*Primary Examiner* — Tuan Q. Dam
*Assistant Examiner* — Zheng Wei
(74) *Attorney, Agent, or Firm* — Birch, Stewart, Kolasch & Birch, LLP (57) ABSTRACT

A system and method for allowing third-party script developers to create secure scripts that can safely be incorporated into software applications is disclosed. The system may provide the flow and mechanisms for enabling a client/server secure scripting environment to be added to a hosted software application development environment so that third-party scripts can be added to software applications without application developers having to be concerned about protecting their applications from malicious scripts. This scripting environment may allow an application to be securely scriptable by untrusted third-party script developers.

15 Claims, 4 Drawing Sheets

(56) References Cited

U.S. PATENT DOCUMENTS

| | | | |
|---|---|---|---|
| 2006/0059462 A1* | 3/2006 | Yamamoto | G06F 17/2247 717/115 |
| 2006/0129982 A1* | 6/2006 | Doyle | G06F 9/45508 717/115 |
| 2006/0161906 A1* | 7/2006 | Becker | G06F 9/45512 717/139 |
| 2009/0049423 A1* | 2/2009 | Yao et al. | 717/108 |
| 2011/0055807 A1* | 3/2011 | Mahajan | G06F 8/61 717/107 |
| 2011/0321131 A1* | 12/2011 | Austel et al. | 726/4 |
| 2012/0297492 A1* | 11/2012 | Court | 726/29 |
| 2013/0212146 A1* | 8/2013 | Hansknecht | G06F 17/30899 709/201 |
| 2013/0275957 A1* | 10/2013 | Villar et al. | 717/173 |
| 2014/0047413 A1* | 2/2014 | Sheive et al. | 717/110 |
| 2016/0070547 A1* | 3/2016 | Ramanathan | G06F 8/36 717/107 |

OTHER PUBLICATIONS

Jesse James Garrett, AjaxL A New Approach to Web Application, published Feb. 18, 2005, pp. 1-5.*

Miller et al., Caja Safe active content in sanitized JavaScript, published Jun. 7, 2008, pp. 1-30.*

Agten et al., JSand: Complete Client-Side Sandboxing of Third-Party JavaScript without Browser Modification, published by ACM, ACSAC' 12, Dec. 3-7, 2012, pp. 1-10.*

International Search Report mailed May 27, 2014 for International Application No. PCT/US2014/018604.

Written Opinion of the International Searching Authority mailed May 27, 2014 for International Application No. PCT/US2014/018604.

Yao-Jan Wu et al., "A Google-Map-Based Arterial Traffic Information System", Proceedings of the 2007 IEEE, Intelligent Transportation Systems Conference, Sep. 30-Oct. 3, 2007, pp. 968-973.

Australian Office Action issued Mar. 7, 2016 in corresponding Australian Application No. 2014223569.

* cited by examiner

THIRD PARTY APPLICATION SCRIPTABILITY

BACKGROUND

Software applications are often developed following specific requirements to provide certain capabilities. Although a software application developer may provide end users with valuable functionality, third party script developers may enhance this basic functionality by providing extensions, automations, plugins, or similar code which change or extend software application functionality, making the application more user-friendly. For example, web application developers may create a software application for sending and receiving email. The web application may include functionality for finding and labeling email. The application may also have a limit on the size capacity of any one end user's email account. However, the web application may not provide end users with the ability to find email messages over a certain size so that they can delete large email messages to free up space in their email account. A third party script developer may write a plugin that, when added to the email application, can find and label all email messages over a certain size. An end user can add the third party developer's plugin to his or her browser and run the plugin to easily find large email messages so that these messages can be deleted when the end user's email account reaches size capacity.

Even though third party scripts can improve end user experiences, very few software application developers allow untrusted third party scripts to be added to their web applications because adding third party functionality makes it difficult for a web application developer to maintain web application security and also makes end users' experiences with the web application inconsistent.

Figure 1:
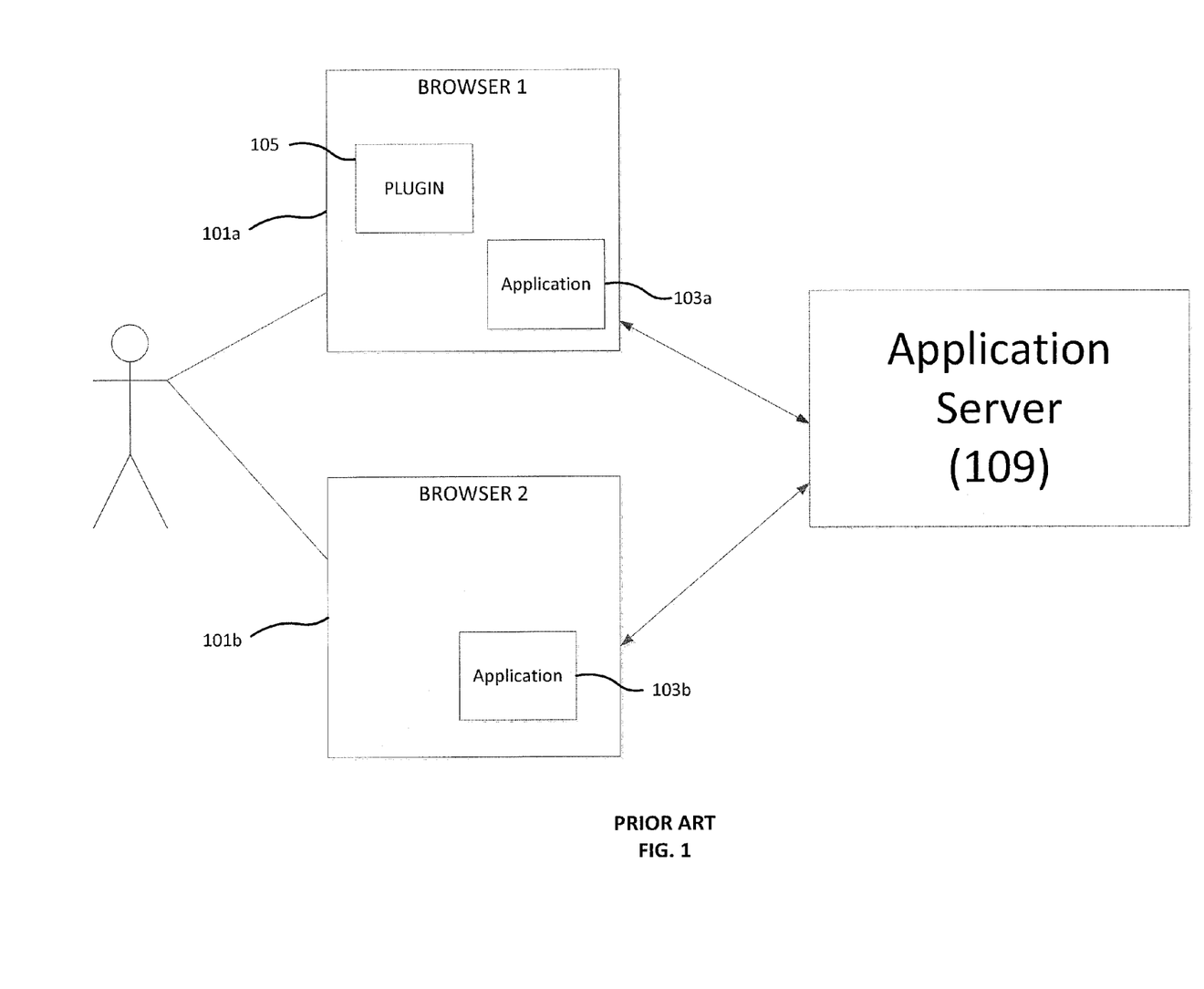
FIG. 1 is a block diagram illustrating a customary embodiment for adding third-party scripts to a web application.

As illustrated in FIG. 1, customary third party scripts (105) most often work at the web browser-level (101a, 101b) and are not an integral part of software applications. A notable example of browser-level third party scripts is a plugin, which is a software component that can customize functionality of a web application. Browser-level scripts are problematic because they are browser-dependent. If an end user installs a script such as the one shown in FIG. 1 (105) for an application (103a) in one browser (101a), but then changes the browser (101b) that he or she is using to access a different instance of the same application (103b), the end user must install the script in the new browser in order to obtain the script's functionality for the application. As shown in FIG. 1, script 105's functionality extension of the application is available in browser 1 (101a), but not in browser 2 (101b) since the script is not installed in browser 2 (101b).

There should be a system that allows third-party script to closely interact with a host application while still remaining secure. The system should allow software application developers to securely add third-party scripting functionality to their hosted applications so that the third-party scripts can be associated with an end user regardless of how the end user is accessing the application.

SUMMARY

This specification describes technologies relating to third party application scriptability in general, and specifically to methods and systems for allowing third-party script developers to securely add functionality to software applications.

In general, one aspect of the subject matter described in this specification can be embodied in a system and method for allowing software application developers to incorporate third-party scripts into their software applications. An exemplary system includes a scripting environment providing at least one of: authentication on a server, access control, limits on client-side scripting, and management of scripts. The system may additionally include one or more processing devices and one or more storage devices that store instructions to create a server-side web service that allows communication between a third-party script client and the application server; create a client-side application programming interface that exposes a subset of the application's functionality and resources; allow the third-party script access to the application's server via the web service; allow the third-party script to access the application's functionality and resources using the client-side application programming interface; and provide an end user with access to the third-party script. A second exemplary system may include a scripting environment as described above, one or more processing devices, and one or more storage devices storing instructions that allow a third-party script developer to: receive an application programming interface from a software application; receive a web service from the software application; create a script that changes the functionality of the software application using the application programming interface and the web service; and allows end users to access the script.

These and other embodiments can optionally include one or more of the following features: a third-party script may define and register a trigger that initiates an action in the third-party script when an event occurs in the application; a software application developer may have the ability to wrap a web service into a scripting library that can be included in a third-party script; a software application developer may be able to load a third party script into the application through an integrated development environment; the integrated development environment may create branding associated with a software application; an end user may be provided with a gallery of application-specific scripts that are available for installation; and an end user may be provided with a dashboard of currently installed scripts where the user can manage installed scripts.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

DETAILED DESCRIPTION

Figure 2:
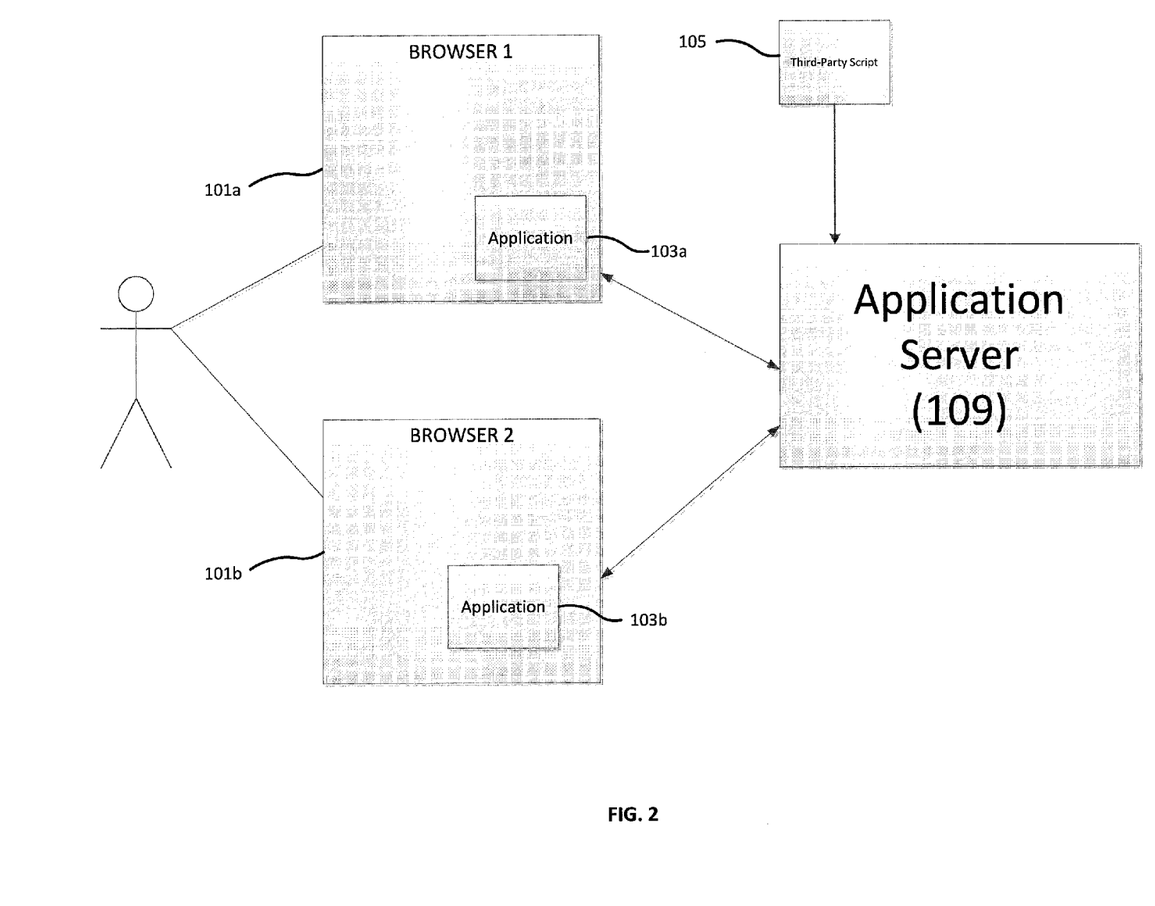
FIG. 2 is a block diagram illustrating an exemplary embodiment for adding third-party scripts to a web application.

According to an exemplary embodiment, a comprehensive plugin-like system can exist that allows software application developers to incorporate third-party scripts into their applications as illustrated in FIG. 2. The system may provide the flow and mechanisms for enabling a secure scripting environment to be added to a hosted software application development environment so that third-party scripts can be incorporated into software applications without application developers having to be concerned about protecting their applications from malicious scripts. This scripting environment may allow an application to be securely scriptable by untrusted third-party script developers. An exemplary scripting environment may use Caja for secure scripting. Caja is a subset of javascript that provides object-capability security. This technology provides a JavaScript sandbox which can alter user scripts and sanitize them by removing precarious method calls. As illustrated in FIG. 2, the application server (109) incorporates the third-party scripts (105) at the application level so the script plugins are independent from the browser (101a, 101b) used to access instances of the application (103a, 103b). A user logged into an application will therefore have the same user experience with the application regardless of the browser with which the user is accessing the application.

An exemplary system may include both client and server scripting components, script hosting, a web integrated development environment (IDE), and a way to view all scripts for a given application.

In some embodiments, an exemplary system includes a client/server secure scripting environment. This scripting environment may provide some or all of the following features: (1) a cloud integrated development environment, (2) server-side scripting runtime, (3) script hosting and libraries, (3) event triggers, (4) account management, (5) built-in application programming interfaces (APIs), (6) oAuth integration, (7) a securable client, (8) scripts that can be granted limited in-browser authority which cannot produce malicious attacks on software application end users, and (9) a per-application gallery to view all scripts that were developed for a specific application. A scripting environment may also provide authentication on a server, access controls, and limits on client-side extensions. Additionally, the scripting environment may manage other details including hosting, server APIs, and account management. In general, an exemplary system should understand the needs of a web application and define methods for a web application to interact with a scripting environment in order for the scripting environment and the web application to interact.

An exemplary embodiment may provide different views and functionalities for different groups of intended users. There may be a view for software application developers, one for third-party script developers, and one for end users.

Software Application Developers

Using an exemplary system, a software application developer may query the scripting environment for an end user's installed scripts, load the installed scripts on the application's client via a sandboxing technology, sandbox the loaded scripts, and allow the loaded scripts to interact with the application's server using a web service created to interact with third-party scripts.

An exemplary embodiment may provide a software application developer with a way to load a script through an integrated development environment (IDE). This development environment may be preloaded with a web service for the software application. An IDE may be able to understand which application opened the IDE. The application can pass along information regarding special features the application may need when it opens the IDE. For example, the application may send a list of application-specific APIs that should autocomplete in the IDE's code editor. IDE can be generic and not know about any particular application while still allowing any application to customize the IDE as needed. The IDE may also have a way to create branding associated with a software application. For example, an application's logo and color scheme may be carried over to the IDE.

In some embodiments, an exemplary system may provide software application developers with the ability to write client-side APIs for their applications. A client-side API may include client-side code and DOM of a particular software application that is accessible to third-party script developers. There may be both standard methods and a template/style guide for adding other methods. Application functionality and resources may be accessed through an application's client-side API. The API defines what application functionality and resources are available to third-party developers. For example, in a spreadsheet application, a script may be written to show a sidebar every time a user selects a cell that contains a formula. In order for the script to be written, the spreadsheet application may provide an API that contains a method for returning the currently selected cell. The returned cell may have properties to determine whether the cell is a formula and provide the cell's value. The spreadsheet API may also contain a method for showing the sidebar. Methods and properties that an application would like to expose to third-party scripts should be defined within the application's API.

An exemplary system may also provide software application developers with tools for writing a server-side web service that may be accessed by third-party scripts in order to communicate with applications' servers. These web services may be written using pre-existing APIs that are provided to software application developers through the scripting environment. These APIs may include REST and SOAP APIs. Alternatively, a software application developer may build a library that can be included in scripts developed by third-party script developers. Software application developers may create RESTful services which support oAuth authentication and can be wrapped into a scripting library.

An exemplary embodiment may additionally provide software application developers with a way to define and register triggers for their applications. A trigger is a mechanism that initiates an action when an event occurs. Triggers may be application specific and chosen by an application developer. Example triggers include: onEdit, onOpen, and onSave. An "onEdit" trigger will fire when an edit occurs in an application. An "onOpen" trigger will initiate an action when something is opened in an application. An "onSave" trigger will fire when something is saved within an application. An application developer may specify a list of event names that may be used as triggering events for which scripts can be written can be written. Scripts can then register a trigger for a specific event with a broker service so that the script is notified when the particular event occurs. The event may be recorded and the event, as well as an optional payload which may be associated with the event, may be provided to the broker service. The broker service may relay news about the triggering event to scripts that are listening for particular event trigger to fire. The broker service may be a REST service and the payload may be written in JSON.

In some embodiments, front-end scripting language code may be provided to load installed scripts into an application on a per end user basis. A front-end scripting language may be JavaScript for example. Each end user may want to include a different subset of scripts written for a specific application. Provided code may find all scripts associated with the application and load the scripts which the end user currently accessing the application has installed.

In addition to facilitating client/server communications among a software application and third-party scripts, an exemplary system may provide a software application developer with a URL that links to a frameable web store view so that the software developer can view his or her application as it appears in a web store. An application may be accessible in a web store so that end users can download and use the application. The software application developer's web store view may include a tab for displaying currently installed scripts for the specific user as well as showing scripts that can be installed.

Third-Party Script Developers

An exemplary system may provide third-party script developers with a server-side web service per application that is aware of the application's context. As discussed above, when scripts run on the exemplary server, the scripts have access to the APIs that the server-side scripting environment provides. The application's context includes data shared within an instance of the application. This data is available across all requests from different users. As explained above, an application's web service is written by the application developer and provided to third-party script developers using the scripting environment. In some embodiments, a third-party script developer may have access to a client-side API for an application which the script developer can use to access functionality and resources from the application in order to write a script for the application. As discussed above, the client-side API provides a third-party script developer with as much access to the software application as the application developer chooses to grant. The third-party script developer may also have access to the application event triggers that fire when certain events occur in the application. An exemplary embodiment may provide synchronous client APIs, the ability for a script to manipulate or control non-contiguous regions of an application's user interface, and scripting ability to respond to a user event such as a button click in a way that a browser may recognize the user event as a direct response to a user action.

An exemplary system may also provide a script developer with an integrated development environment that may have a specified application web service pre-loaded. This scripting development environment may be accessible via the application for which the script developer is writing the script. Additionally, an exemplary system may provide web store integration that allows a script developer to specify the application for which the script developer's script has been written.

End Users

End users of software applications that have enabled third-party scripting may see a gallery of application-specific scripts that are available for installation. End users may also have a dashboard of currently installed scripts where users can manage their installed scripts on a per-application basis.

According to an exemplary embodiment, an exemplary method begins with running a software application for which third-party scripts have been developed. The software application may be run using an end user's authentication credentials and may run code to obtain third-party scripts for the application that the authenticated end user has installed. URLs may be returned for each script. The scripts may then be loaded and run with the associated web application. Some scripts may rely on triggers in order to execute, but will listen for triggers associated with the web application.

Figure 3:
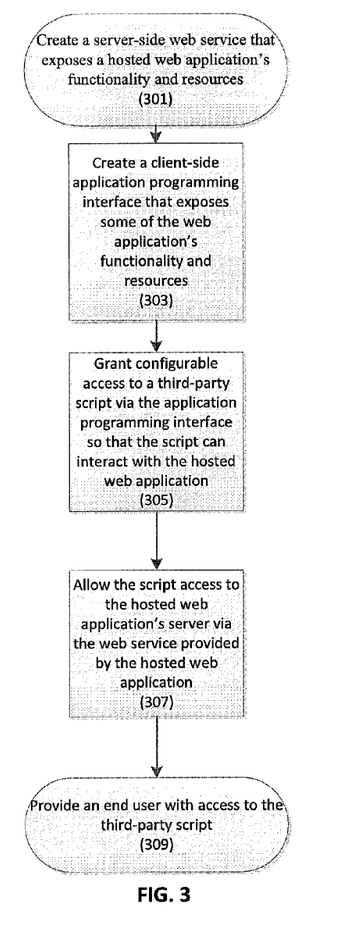
FIG. 3 is a flow diagram of an exemplary method for adding third-party scripts to a web application.

As discussed above and illustrated in FIG. 3, according to another embodiment, an exemplary system may enable a web application developer to create a server-side web service that exposes a hosted web application's functionality and resources (301). The system may also allow the web application developer to create a client-side application programming interface (API) that exposes some of the web application's functionality and resources (303). The web application developer may then grant configurable access to a third-party script via the application programming interface so that the script may interact with the web application (305). The third-party script may then be allowed to access the web application's server via the web service provided by the web application developer (307). A third-party script developer may develop a script that uses the client-side API and the web service to interact with the web application. An end user may then be provided with access to the third-party script and may choose to incorporate this script into his or her web application profile (309).

Figure 4:
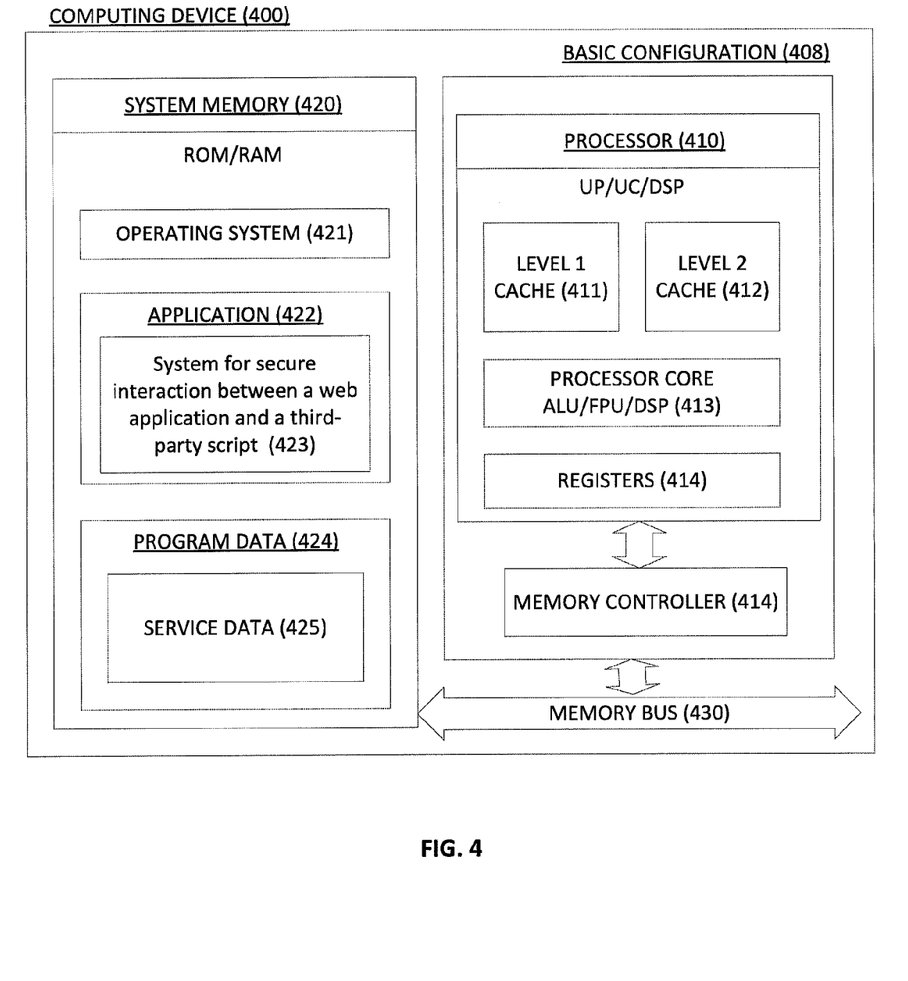
FIG. 4 is a block diagram illustrating an exemplary computing device.

FIG. 4 is a high-level block diagram of an exemplary computer (400) that is arranged for allowing third-party script developers to securely add functionality to software applications using a browser-based script editor in a hosted web application execution environment and may be used to implement systems, apparatus, and methods described within this document. In a very basic configuration (401), the computing device (400) typically includes one or more processors (410) and system memory (420). A memory bus (430) can be used for communicating between the processor (410) and the system memory (420).

Depending on the desired configuration, the processor (410) can be of any type including but not limited to a microprocessor (µP), a microcontroller (µC), a digital signal processor (DSP), or any combination thereof. The processor (410) can include one more levels of caching, such as a level one cache (411) and a level two cache (412), a processor core (413), and registers (414). The processor core (413) can include an arithmetic logic unit (ALU), a floating point unit (FPU), a digital signal processing core (DSP Core), or any combination thereof. A memory controller (416) can also be used with the processor (410), or in some implementations the memory controller (415) can be an internal part of the processor (410).

Depending on the desired configuration, the system memory (420) can be of any type including but not limited to volatile memory (such as RAM), non-volatile memory (such as ROM, flash memory, etc.) or any combination thereof. System memory (420) typically includes an operating system (421), one or more applications (422), and program data (424). The application (422) may include a method for secure interaction between a web application and a third-party script in a hosted web application execution environment. Program Data (424) includes storing instructions that, when executed by the one or more processing devices, implement a system and method for allowing third-party script developers to securely add functionality to software applications. (423). In some embodiments, the application (422) can be arranged to operate with program data (424) on an operating system (421).

The computing device (400) can have additional features or functionality, and additional interfaces to facilitate communications between the basic configuration (401) and any required devices and interfaces.

System memory (420) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media can be part of the device (400).

The computing device (400) can be implemented as a portion of a small-form factor portable (or mobile) electronic device such as a cell phone, a personal data assistant (PDA), a personal media player device, a wireless web-watch device, a personal headset device, an application-specific device, or a hybrid device that include any of the above functions. The computing device (400) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system for allowing software application developers to incorporate third-party scripts into their software applications, the system comprising:
    a scripting environment providing at least one of: authentication on a server, access control, limits on client-side scripting, and management of scripts;
    one or more processing devices including one or more processors; and
    one or more storage devices storing instructions that, when executed by the one or more processing devices, cause the one or more processing devices to allow a software application developer to:
    create a server-side web service that allows communication between a third-party script and an application server for a hosted web application and exposes the hosted web application's functionality and resources, the third-party script being browser-independent and created external to the software application in which the third-party script is being incorporated;
    create a client-side application programming interface that exposes a subset of the hosted web application's functionality and resources;
    allow the third-party script access to the application server via the web service;
    allow the third-party script to access the hosted web application's functionality and resources using the client-side application programming interface; and
    provide an end user with access to the third-party script that is independent of the browser used to access the hosted web application.

2. The system of claim 1 further comprising allowing the third-party script to define and register a trigger that initiates an action in the third-party script when an event occurs in the application.

3. The system of claim 1 further comprising allowing a software application developer the ability to wrap the web service into a scripting library that can be included in the third-party script.

4. The system of claim 1 further comprising allowing a software application developer the ability to load the third party script into the application through an integrated development environment.

5. The system of claim 4 wherein the integrated development environment creates branding associated with the application.

6. The system of claim 1 further comprising providing an end user with a gallery of application-specific scripts that are available for installation.

7. The system of claim 1 further comprising providing an end user with a dashboard of currently installed scripts where the user can manage installed scripts.

8. A system for allowing third-party script developers to write scripts for software applications in a hosted application execution environment, the system comprising:
    a scripting environment providing at least one of: authentication on a server, access control, limits on client-side scripting, and management of scripts;
    one or more processing devices including one or more processors; and
    one or more storage devices storing instructions that, when executed by the one or more processing devices, cause the one or more processing devices to allow a third-party script developer to:

receive an application programming interface from a software application that exposes a subset of a hosted application's functionality and resources;

receive a server-side web service that allows communication between a third-party script and an application server, and exposes the hosted application's functionality and resources;

create a third-party script that changes the functionality of the software application using the application programming interface and the web service, the third-party script being browser-independent and created external to the software application in which the third-party script is being incorporated; and allows end users to access the third-party script that is independent of the browser used to access the software application.

9. A computer-implemented method for allowing software application developers to incorporate third-party scripts into their software applications comprising:

creating a server-side web service that allows communication between a third-party script and an application server for a hosted web application and exposes the hosted web application's functionality and resources, the third-party script being browser independent and created external to the software application in which the third-party script is being incorporated;

creating a client-side application programming interface that exposes a subset of the hosted web application's functionality and resources;

allowing the third-party script access to the application server via the web service;

allowing the third-party script to access the hosted web application's functionality and resources using the client-side application programming interface; and providing an end user with access to the third-party script that is independent of the browser used to access the hosted web application.

10. The computer-implemented method of claim 9 further comprising allowing the third-party script to define and register a trigger that initiates an action in the third-party script when an event occurs in the application.

11. The computer-implemented method of claim 9 further comprising allowing a software application developer the ability to wrap the web service into a scripting library that can be included in the third-party script.

12. The computer-implemented method of claim 9 further comprising allowing a software application developer the ability to load the third party script into the application through an integrated development environment.

13. The computer-implemented method of claim 12 wherein the integrated development environment creates branding associated with the application.

14. The computer-implemented method of claim 9 further comprising providing an end user with a gallery of application-specific scripts that are available for installation.

15. A computer-implemented method for allowing third-party script developers to write scripts for software applications in a hosted application execution environment comprising:

receiving an application programming interface from a software application that exposes a subset of a hosted application's functionality and resources;

receiving a server-side web service that allows communication between a third-party script and an application server, and exposes the hosted application's functionality and resources;

creating a third-party script that changes the functionality of the software application using the application programming interface and the web service, the created third-party script being browser-independent and created external to the software application in which the created third-party script is being incorporated; and allowing end users to access the created third-party script that is independent of the browser used to access the software application.

* * * * *

UNITED STATES PATENT AND TRADEMARK OFFICE
CERTIFICATE OF CORRECTION

PATENT NO.         : 9,465,586 B2
APPLICATION NO. : 13/779599
DATED              : October 11, 2016
INVENTOR(S)        : Corey Goldfeder It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 28 days.

Signed and Sealed this
Twenty-fifth Day of September, 2018

Andrei Iancu
*Director of the United States Patent and Trademark Office*